(12) United States Patent
Ford et al.

(10) Patent No.: US 7,574,314 B2
(45) Date of Patent: Aug. 11, 2009

(54) SPURIOUS SIGNAL DETECTION

(75) Inventors: Simon Andrew Ford, Cambridge (GB); David Michael Bull, Cambridge (GB); Alastair David Reid, Cambridge (GB)

(73) Assignee: ARM Limited, Cambridge (GB)

( * ) Notice: Subject to any disclaimer, the term of this patent is extended or adjusted under 35 U.S.C. 154(b) by 9 days.

(21) Appl. No.: 11/898,923

(22) Filed: Sep. 17, 2007

(65) Prior Publication Data

US 2008/0097713 A1    Apr. 24, 2008

(30) Foreign Application Priority Data

Oct. 23, 2006    (GB) .............................. 0621056.1

(51) Int. Cl.
*G01R 29/02* (2006.01)
*G01R 25/00* (2006.01)

(52) U.S. Cl. .................. 702/79; 702/58; 702/117; 714/30; 714/55; 714/819

(58) Field of Classification Search .................. 702/58, 702/79, 117; 714/30, 55, 708, 819; 331/105
See application file for complete search history.

(56) References Cited

U.S. PATENT DOCUMENTS 3,699,554 A * 10/1972 Jones ........................... 360/43

6,774,823 B1 * 8/2004 Schafferer .................... 341/61
2004/0123137 A1    6/2004 Yodaiken
2005/0222789 A1    10/2005 West

OTHER PUBLICATIONS

Moll et al., 'Methodology of Detection of Spurious Signals in VLSI Circuits', 1993, IEEE Publication, pp. 491-496.*
Pudov, 'Elimination of Spurious Signal due to Misalignment of Magnetic Axes of a Differential Magnetic-Modulation Transducer', 2000, RJNT Publication, pp. 1-8.*
Search Report for related application No. GB0621056.1 dated Dec. 22, 2006.

* cited by examiner

*Primary Examiner*—Edward Raymond
*Assistant Examiner*—Elias Desta
(74) *Attorney, Agent, or Firm*—Nixon & Vanderhye P.C.

(57) ABSTRACT

A circuit for a data processing apparatus and a method for detecting spurious signals is disclosed, the circuit comprising a data input operable to receive digital signal values, spurious signal detection logic operable to monitor a digital signal value within the circuit, and to determine at least one of: a safe time window during which it is expected that the digital signal values input into the circuit may cause data transitions in the monitored digital signal value and a transition time window in which it is expected a data transition will occur; and in response to detecting either a data transition in the monitored digital signal value outside of the at least one safe time window or no data transition in the transition window, the spurious signal detection logic is operable to output a detection signal.

20 Claims, 9 Drawing Sheets

SPURIOUS SIGNAL DETECTION

BACKGROUND OF THE INVENTION

1. Field of the Invention

This invention relates to the field of data processing systems. More particularly, this invention relates to detection of spurious activity within a circuit.

2. Description of the Prior Art

Techniques exist for protecting secure systems such as smart cards and detecting signals that may indicate that the card is under attack. These can take the form of mechanical protection mechanisms, whereby if the casing around the smart card is damaged ingress of UV light causes the circuit to be damaged such that no data can be derived from it. Additionally they can be protected by having circuits for detecting a drop in a voltage line indicating a probe wire trying to force a value, or by having additional logic to detect if invalid conditions occur such as non-secure accesses trying to access a secure address space.

These protection systems primarily detect logical errors during processing or integrity violations by mechanical observations.

The Razor project at ARM provides a circuit level technique for detecting when a circuit has not reacted fast enough for the clocking speed used.

It would be advantageous to use circuit level techniques to detect unexpected behaviour or spurious signals in a circuit.

SUMMARY OF THE INVENTION

A first aspect of the present invention provides a circuit for a data processing apparatus, said circuit comprising a data input operable to receive digital signal values, said circuit comprising: spurious signal detection logic operable to monitor a digital signal value within said circuit, and determine at least one of: a safe time window during which it is expected that said digital signal values input into said circuit may cause data transitions in said monitored digital signal value and a transition time window in which it is expected a data transition will occur; and in response to detecting either a data transition in said monitored digital signal value outside of said at least one safe time window or no data transition in said transition window, said spurious signal detection logic is operable to output a detection signal.

The present invention recognises that in many circuits where a digital signal value is launched into the circuit a time period during which a signal value is expected to transition (if it is going to transition) in response to said launched digital signal value can be determined. If a data transition is detected outside of this time period then it can be assumed that such a data transition is probably not due to the launched digital signal values and as such the signal is unexpected or spurious and may be an indication of something such as an attack from outside. Furthermore in some circuits, it may be that there is a time when a transition should occur and if no transition does occur then this may also be an indication of some sort of problem. Thus, a circuit that can define these time windows and then detect signals in relation to them can increase the security and/or robustness of the system.

In some embodiments said circuit comprises a synchronous circuit clocked by a clock signal, said digital signal value being clocked into said circuit; said spurious signal detection logic being operable to determine at least one of a safe time window and a transition time window for each of said clock cycles.

Embodiments of the invention are particularly applicable to a synchronous circuit with the spurious signal detection logic being able to detect spurious signals in each clock cycle. In many synchronous circuits, data levels may transition in each clock cycle, however, the point where they transition in the clock cycle may be a small portion of that clock cycle, and thus, providing a boundary within which it is expected that the signals may or should transition can provide an efficient mechanism for detecting errors.

In some embodiments, said safe time window comprises a time between a start of a clock cycle and a transition of said monitored digital signal value.

In some systems, it may be that a signal only makes a single transition per clock cycle. In such a system, if more than one transition occurs within a cycle then this is indicative of an error. Thus, a safe time window can be defined as being until the transition of the digital signal value and if a further transition occurs then it is clear that this is a spurious signal and it can be detected as such.

In some embodiments, spurious detection logic is operable to monitor two digital signal values and said safe time window comprises a predetermined time following a transition of one of said two monitored digital signal values.

In some systems, two or more signals may have a defined timing relationship between them such that in the event of both signals transitioning then the relative time of the transitions of both signals is bounded. Thus, if one transitions much later than the other this too can be indicative of an error. Embodiments of the present invention are suitable for detecting such a situation by simple defining the safe time window in an appropriate manner.

In some embodiments, said digital signal values received from said data input are received from registers, and said safe time window is dependent upon a state of said registers, such that in response to at least one predetermined state of said register said safe time window is zero.

In a circuit fed by registers the circuit may only make a transition for a given sub-set of states held by the registers. Embodiments of the invention can detect where a transition occurs when it shouldn't by setting the safe time window to zero in dependence upon predetermined states of the registers. Thus, if the registers are not in one of the given subsets of states no transition should occur and the safe time window is zero. A transition at such a time indicates some sort of problem.

In some embodiments, said safe time window is dependent upon an enabled state of said registers, such that in response to said registers not being enabled said safe time window is zero.

If a circuit is entirely fed by signals output from registers which are conditionally clocked then if none of the registers are enabled no transition should occur in any of the signals in the circuit. A circuit of an embodiment of the invention can detect this by making a safe time window dependent upon an enabled state of the registers and making it zero in response to them not being enabled.

In some embodiments said digital signal values received from said data input are received from registers, and said transition time window is dependent upon a state of said registers.

In some systems, the system fed by registers may always make a transition for a given subset of states held by the registers. An embodiment of the present invention can detect this by making the transition time window dependent upon the state of the registers.

In some embodiments, said spurious detection logic is further operable to detect at least one input and in response to detecting a data transition within said safe time window is operable to output a detection signal if said at least one input has a predetermined value.

It may be that in some systems a transition of a particular signal at a particular time is only valid for a certain set of inputs. The embodiment of this invention detects transitions that occur without these valid set of inputs by detecting a data transition in a safe time window and detecting if an input has a predetermined value at the same time. If this occurs then a spurious detection signal is output.

In some embodiments, said circuit further comprises a sticky bit data store, said spurious signal detection logic being operable to output said detection signal to said sticky bit data store, such that a value stored in said sticky bit data store is indicative of whether a spurious signal has been detected.

Detection of a spurious signal may be very important for the circuit and thus, it needs to be indicated and furthermore it needs to be indicated in a way that it can not be overwritten. Thus, a sticky bit data store may be used such that as soon as a spurious signal is detected the stick bit is set and the system knows that a spurious signal is present. In alternative embodiments the detection of a spurious signal may be used to initiate an interrupt.

In some embodiments, said circuit further comprises processing logic, said spurious signal detection logic being operable to output said detection signal to said processing logic.

Detection of a spurious signal may warrant other processes to be performed. Thus, the spurious signal detection logic is output in some embodiments to processing logic which can perform the required acts in response to detecting the signal.

In some embodiments, said digital signal values are received from logic, and said safe time period is determined from an estimated minimum and maximum time for said digital signal values launched into said logic to reach said data input of said circuit.

In some circuits, digital signal values are propagating through a system and a safe time period can be estimated between a minimum and maximum time within which it is expected that these propagating signals will cause a data transition. Thus, circuits which have propagated values can have this spurious signal detection implemented within them and can thereby be made more secure.

In some embodiments, said circuit further comprises logic, said digital signal values being launched into said logic and passing through said logic, said spurious signal monitoring logic being operable to monitor a signal value at a point within said logic.

In some circuits, the digital signal values are launched into logic within the circuit and the spurious signal can detect a value at a point within the logic. If the properties of the logic are known then it is known when the data should transition in response to a signal launched into the logic and an appropriate safe time window can be determined and spurious signal detection can be implemented.

In some embodiments, at least a portion of said logic is operable to cause a delay to said transmission of said digital signal value such that at least one of said safe time window and transition time window is delayed with respect to said digital signal launch point.

It may be that it is desirable to delay the safe time window or the transition time window with respect to the digital signal launch point. This can be done with logic and it can then be the delayed transmission of the signal that is looked for.

In some embodiments, said circuit comprises at least one flip flop.

Embodiments of the invention can be applied to flip flops wherein data is transmitted through the flip flop at each clock cycle and it is known when the data signal should transition within the clock cycle. Thus, an extra error detection measure can be implemented within the flip flop to check to see whether or not a signal transition happens outside of this relatively small time window. Flip flops are present in many circuits, and thus, implementing the invention in a flip flop allows, this error detection mechanism to be simply implemented in many different circuits.

In some embodiments, spurious signal detection logic is operable to detect all data transitions occurring outside of said safe time window. While in others, only a single or a portion of the data transitions occurring outside of the safe time window are detected.

In some embodiments, said circuit comprises an asynchronous circuit and comprises an output operable to output a data valid signal, said safe time window comprises a time following reception of an acknowledgement signal from a receiver and prior to outputting said data valid signal.

In some asynchronous circuits it is known that the data should not change between the time that the data is presented as valid by the producer and the acknowledge is received from the consumer. Embodiments of the present invention can detect where data transitions occur within this time window by setting the safe time window appropriately.

In some embodiments, said circuit comprises an asynchronous circuit and comprises an output operable to output a data valid signal, and said safe time window comprises a time starting a predetermined time after said data valid signal is output and extending until a subsequent data valid signal is output.

In some asynchronous circuits the data should remain stable for a fixed period relative to the valid indication. This too can be monitored using embodiments of the present invention that set the safe time window appropriately.

In some embodiments, said data processing apparatus is a smart card.

Embodiments of the present invention are particularly applicable to smart cards, where it is important to detect spurious signals which may be signals input into the smart card to try to gain access to secure data.

In some embodiments, said spurious signal detection logic is operable to determine said at least one safe time window from a value within a data store in said circuit.

The safe time window may be specified within the circuit itself, alternatively, it could be specified from outside.

A further aspect of the present invention provides a method of detecting spurious signals within a circuit comprising: inputting digital signal values into said circuit; monitoring a digital signal value within said circuit; determining at least one at least one of: a safe time window during which it is expected that said digital signal values input into said circuit may cause data transitions in said monitored digital signal value and a transition time window in which it is expected a data transition will occur; and in response to detecting either a data transition in said monitored digital signal value outside of said at least one safe time window or no data transition in said transition window, said spurious signal detection logic is operable to output a detection signal; outputting a signal indicating a spurious signal has been detected.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
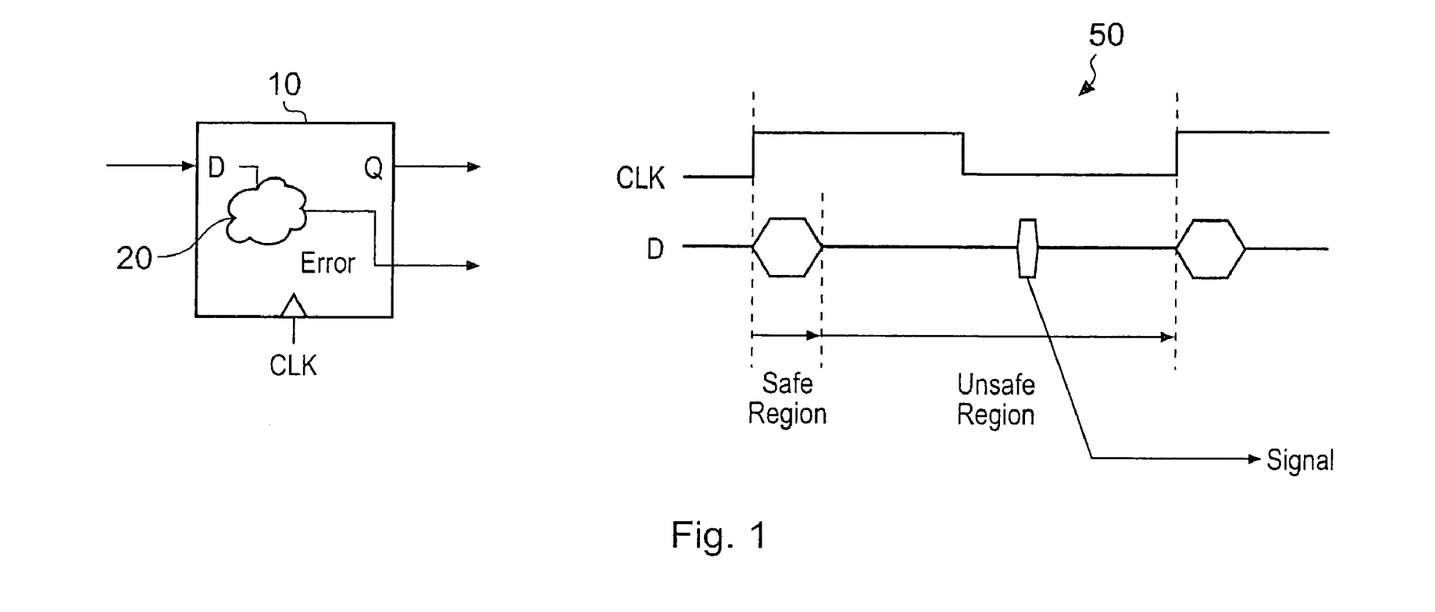
FIG. 1 shows a flip flop having spurious signal detection logic according to an embodiment of the present invention.

FIG. 1 shows a circuit according to an embodiment of the present invention. This circuit is a flip flop 10 comprising additional "spurious signal detection" logic 20. The function of the additional logic 20 is to detect transitions outside the window where signal propagation would normally occur. In this embodiment, a signal is detected at the input of the flip flop and a safe time window is defined within which transitions would be expected. Transitions occurring outside of this safe time window are considered to be spurious. On detection of such a signal, logic 20 output an "error" signal to the error output of the flip flop 10. Adapting a flip flop in such a way provides a revised flip flop cell which could be part of a cell library. The additional logic within the flip flop would result in an increased area for the flip flop, but the added feature would be useful to people using cell libraries to design secure systems. Thus, it could, for example, provide circuit level detection of spurious signals to smart card designers working with cell libraries.

Timing diagram 50 shows the clock signal with the input D having a safe region in which a transition at the input is expected. It shows a transition during the unsafe region which generates an error. The error could be latched locally or collected globally to indicate to a system that an error has occurred. It can be made visible to the system by setting a sticky bit, or firing an interrupt.

Figure 2:
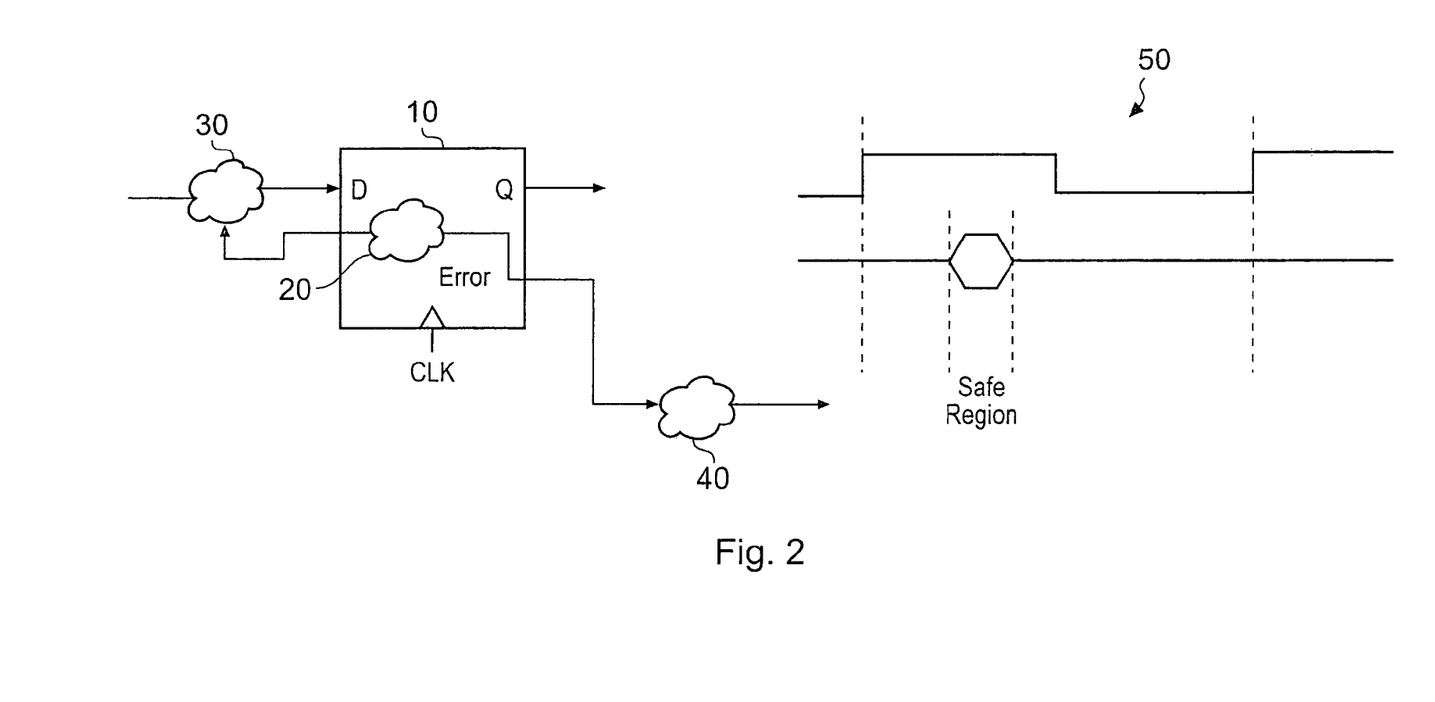
FIG. 2 shows an alternative embodiment of a flip flop.

FIG. 2 shows an alternative flip flop wherein logic 20 is operable to detect data transitions within logic 30 on the input to the flip flop 10. Logic 30 acts to delay the propagating signal and thus, the safe time window moves within the clock pulse as is shown in timing diagram 50. Logic 30 can therefore be used to delay the safe region if this is useful, or it may be that this logic is required for some function. In either case the logic determining the safe time window (in this case a timing circuit within logic 20) will set it to the appropriate place. As in the embodiment of FIG. 1 if a data transition outside of the safe region is detected an error is output at error output. In this embodiment a detected error signal is sent to processing logic 40 which acts to control some function such as powering down of the flip flops and outputting an error indication.

Figure 3:
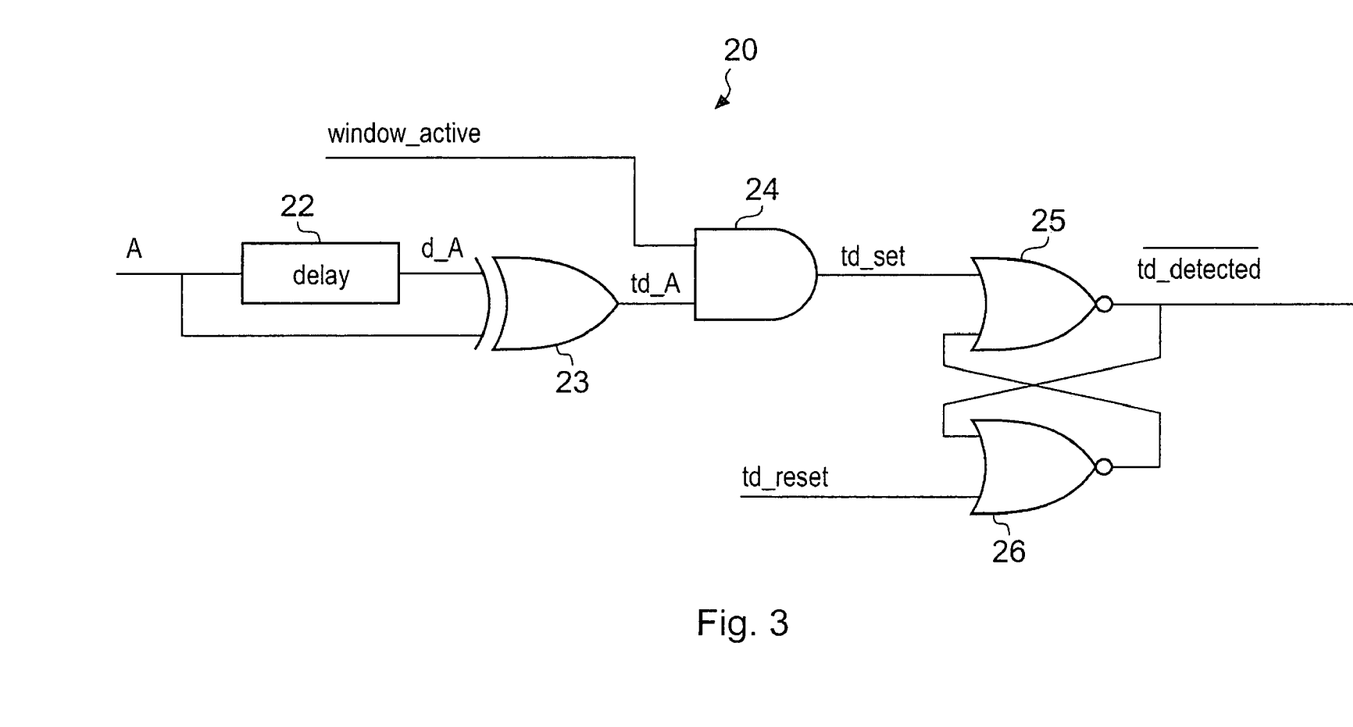
FIG. 3 shows an example of spurious signal detection logic.

FIG. 3 shows schematically an example of spurious signal detection logic 20. This is one of the simplest examples of such a circuit. It can detect transitions from 0 to 1, 1 to 0 or 1 to 0, 0 to 1 depending on the length of the delay element.

A transition on the node A provides a pulse on td_A. If the window_active signal is 1 this indicates that you are outside of the safe time window and in such a case this pulse will be transferred to the set input of the SR latch 25, 26 which at present holds the inverse value of the transition detection status. This is then set to hold a status indicating that the transition has been detected. This is then sampled and after the state of the transition detection latch has been sampled, it is reset using the td_reset signal. Thus, this simple circuit is able to detect a transition in state that occurs outside of a safe time window.

Alternatively, it could be used to detect a transition window, in which case the window_active would mean that you were within the transition window and a transition within this window would reset the SR latch to indicate that the expected transition had been detected. If no transition was detected then at the end of this transition window an error signal could be output.

The window_active signal is the signal that defines the safe time window and can be generated from a timing circuit. Clearly the circuit can be varied to produce the time window required for a particular circuit.

Figure 4:
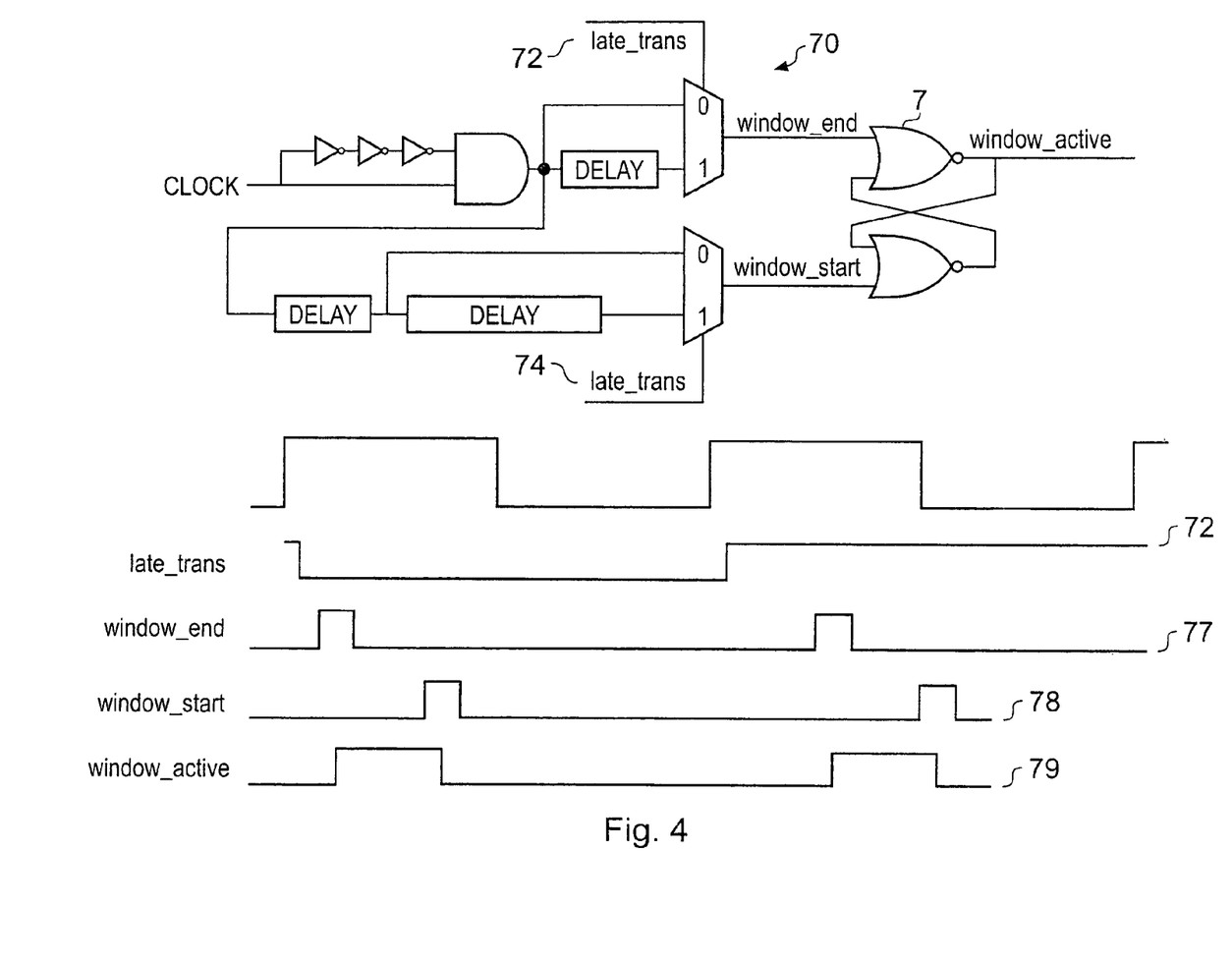
FIG. 4 shows an example of a timing circuit for generating a timing window.

FIG. 4 shows a timing circuit 70 operable to generate a "window_active" signal to define a timing window in a circuit such as the circuit of FIG. 3. This circuit could be used to define either a safe time window wherein it is expected that a signal should transition if it is going to, such as is the case in FIG. 3, or a transition window wherein a signal must transition and if it does not then this is indicative of an error. In this circuit a set/reset flip flop 75 is triggered by a "window_start" signal 78 that defines one edge of the timing window and a window_end signal 77 that defines the other edge of the window. These signals are generated by a late_trans signal 72 whose properties can be altered to change the properties of the timing window.

FIG. 4 is only one example of a suitable timing circuit and it would be clear to the skilled person that there are a number of circuits that could produce such a timing window. The important thing is that the size and position of the window can be selected so that the circuit can be configured to react to data transitions occurring or not occurring at particular times. This can be done, for example, by a signal such as late_trans as is the case in the circuit of FIG. 4. The signal late-trans could be set in response to values stored in a data store indicating the maximum and minimum "safe time" for a data transition, or they may be set by a user configuring the circuit or late_trans may be set a signal input from elsewhere or a it may be a signal generated based on the state of particular elements in the circuit.

Figure 5:
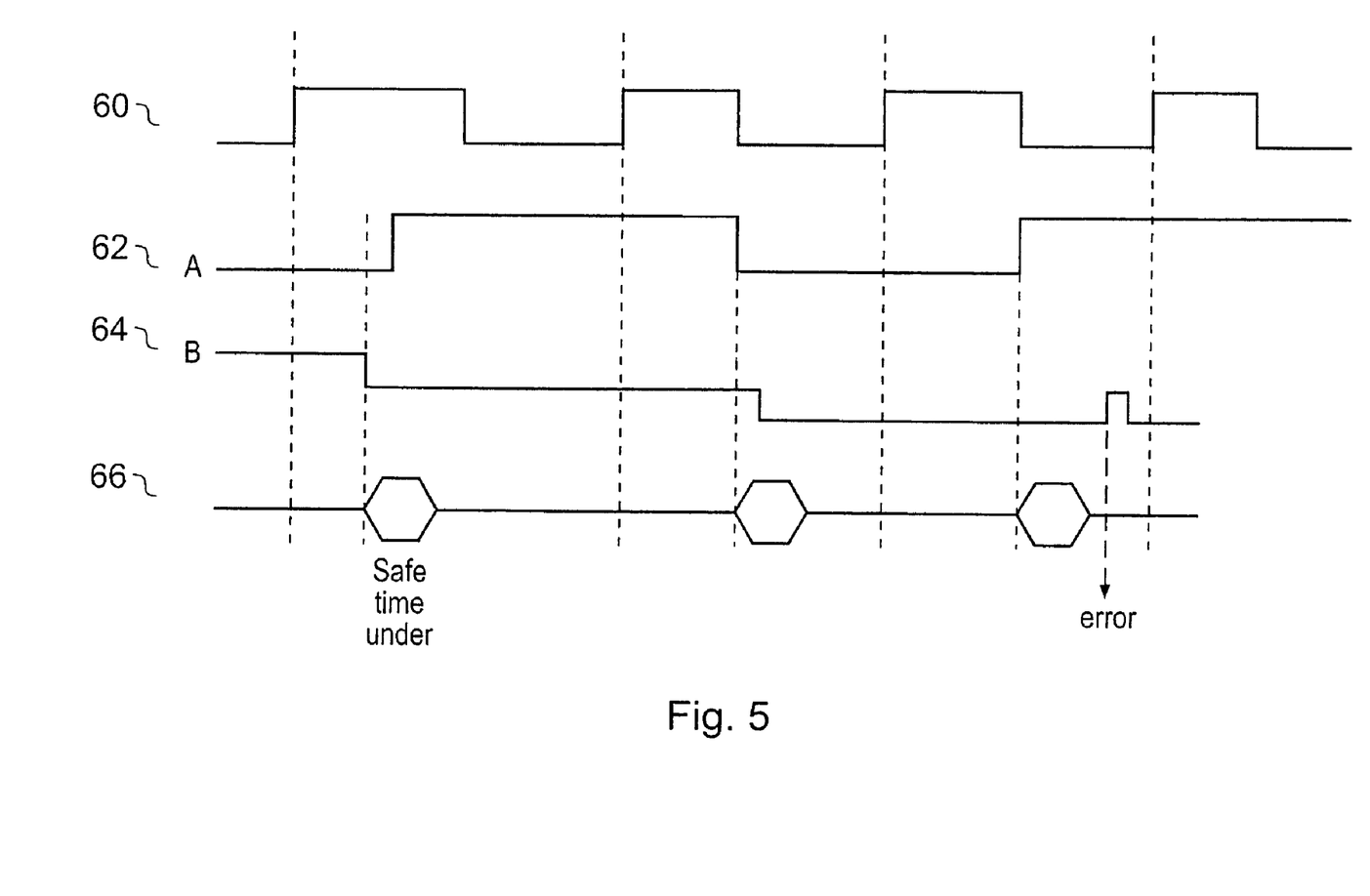
FIGS. 5 and 6 show timing diagrams giving safe time windows for two example circuits.

FIG. 5 shows a timing diagram of an alternative embodiment of the present invention. In this timing diagram there is a clock signal 60 which clocks a circuit. There is an input signal A 62 to the circuit and an input signal B 64. The circuit is configured such that the two input signals A and B have a defined timing relationship between them, such that in the event of both signals transitioning, then the relative time of the transitions of both signals is bounded such that if one transition is much later than the other then this is indicative of an error. Thus, a safe time period 66 can be defined as being a predetermined time after a transition of a first one of the two signals. Any transition outside of this safe time window will be indicative of a spurious signal and can be output as some sort of error signal.

Figure 6:
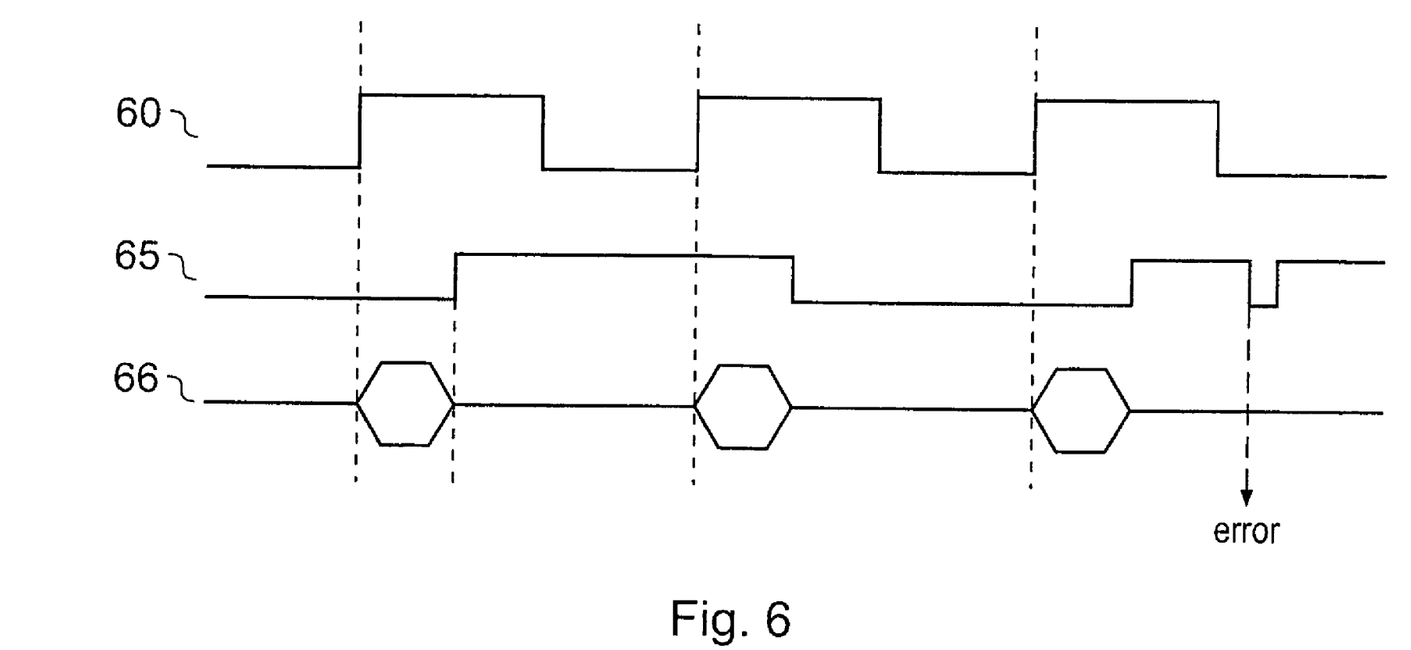

FIG. 6 shows an alternative embodiment, where it is expected that an input signal 65 only makes one transition per clock cycle. Thus, there is a safe time window 66 between the beginning of the clock cycle and it making its transition. Any transition in the signal outside of this safe time window is indicative of a spurious signal.

Figure 7:
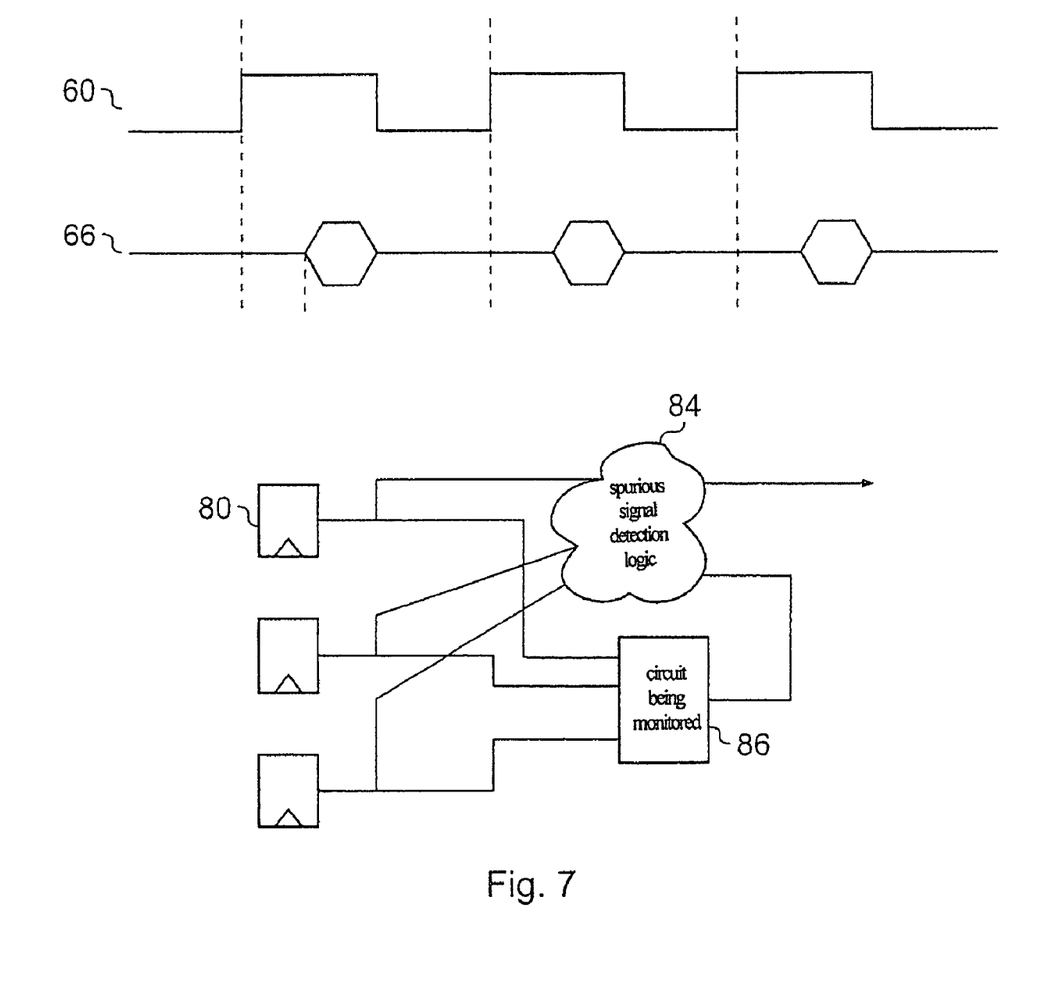
FIG. 7 shows a circuit, spurious signal detection logic and a timing diagram.

FIG. 7 shows a further embodiment, wherein a device comprises registers 80 and spurious signal detection logic 84. A circuit 86 receives signals from registers 80 and a signal value within this circuit may transition in response to the input signals. It is determined, that for certain states of the registers there should be no signal transition in the output of circuit 86. Thus, spurious signal detection logic 84 monitors the output of circuit 86 and also has as its input registers 80. Thus, it can determine the state of the registers and if they are in the predetermined state wherein no transitions are expected it can set its safe time window to zero and any transitions within this time window will produce an error signal.

Figure 8:
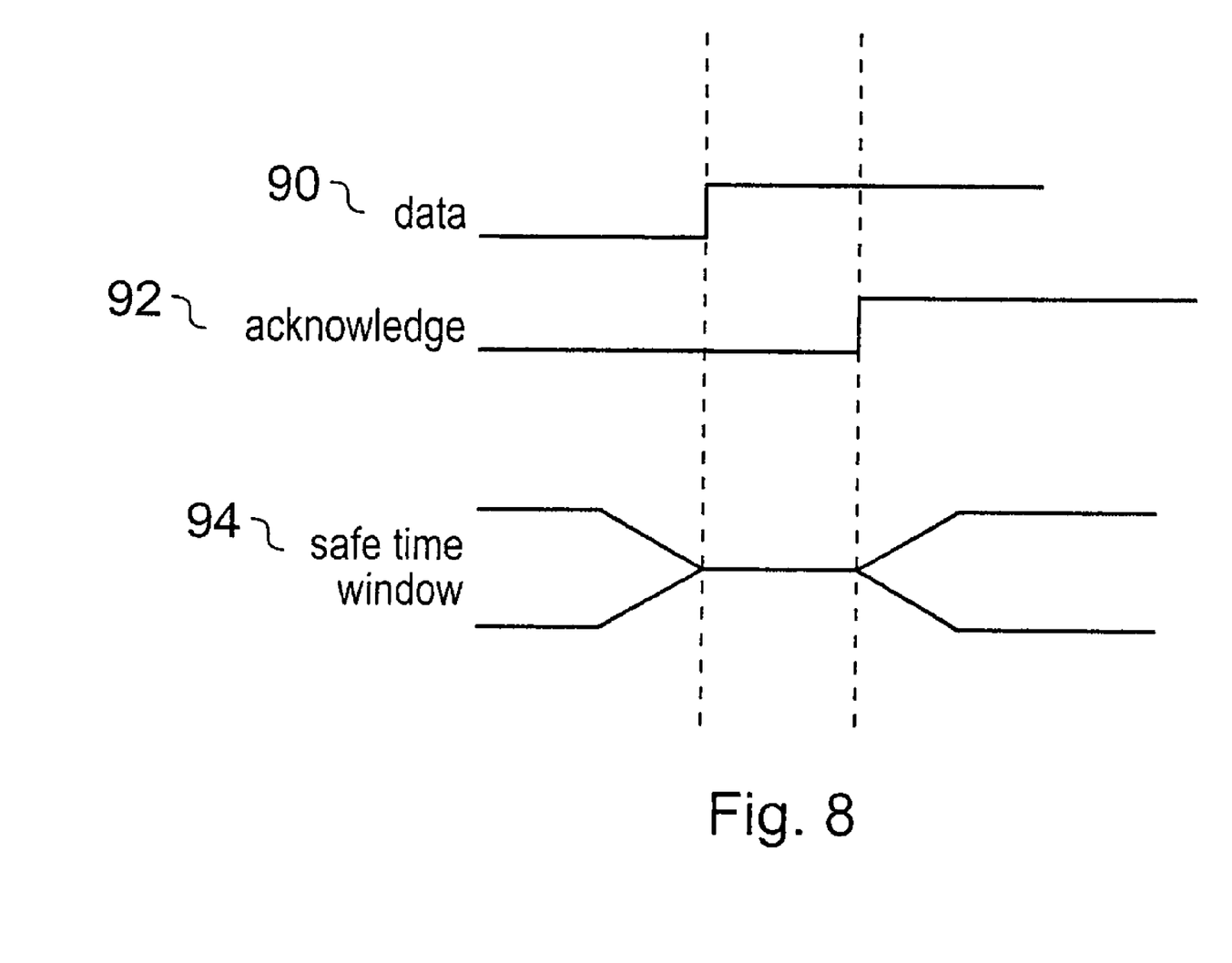
FIG. 8 shows a timing diagram for an asynchronous circuit.

FIG. 8 shows an asynchronous timing diagram for an asynchronous embodiment of the present invention. In this timing diagram there is data input 90 which is the data value sent to a system and then there is the acknowledge signal 92 which is set back from the system to acknowledge that the data has been received. Between the data being sent and the acknowledge signal being received there should not be a transition of the data value 90 as this can clearly lead to errors. Thus, the safe time window can be viewed as being the window around these two points. If a data transition lies in between then there may be an error in the system and spurious signal detection logic will detect this.

Figure 9:
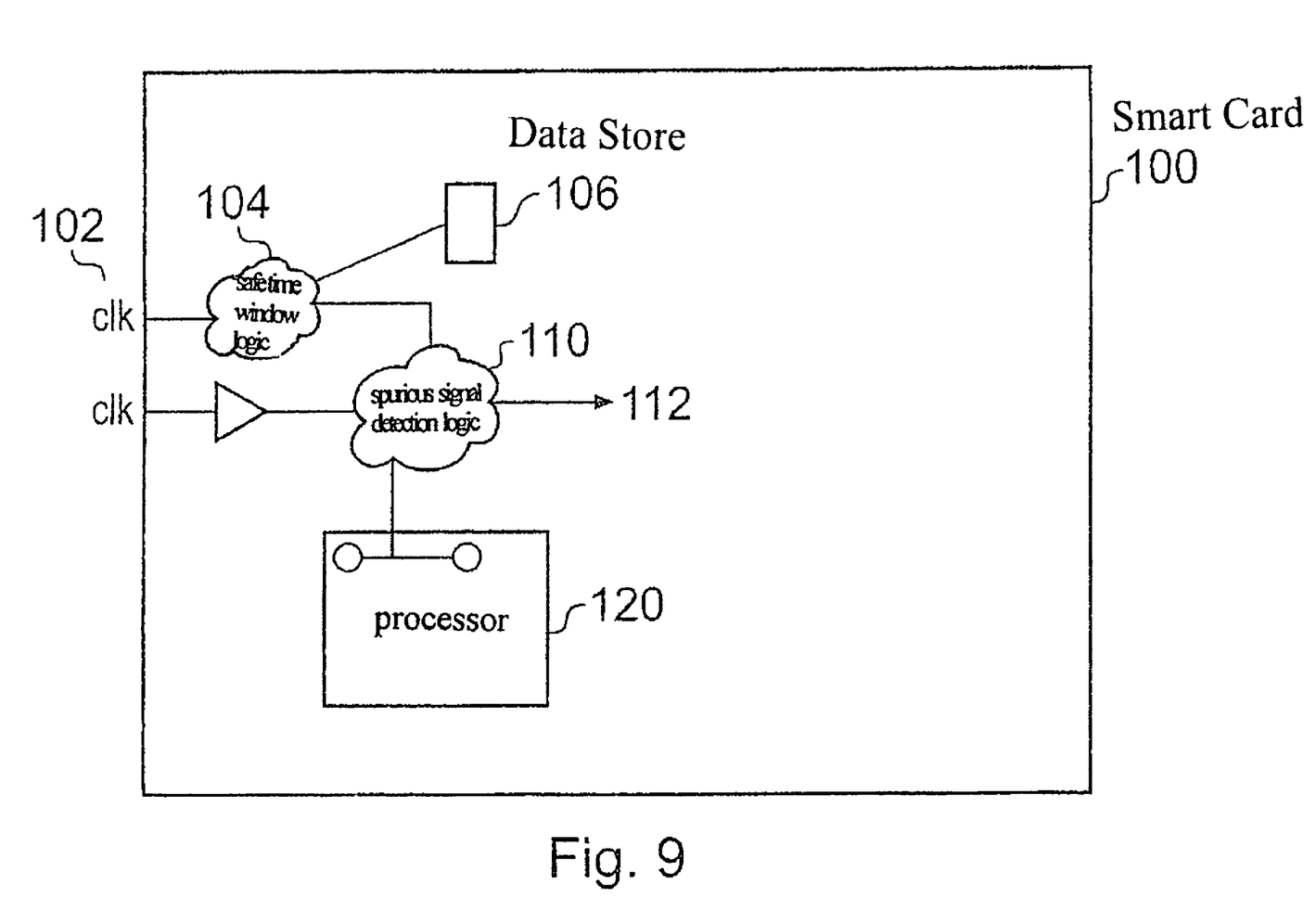
FIG. 9 shows a smart card according to an embodiment of the present invention.

FIG. 9 shows a smart card 100 according to an embodiment of the present invention. Smart cards are secure systems where it is very important that information stored on the smart card is not available to any unauthorised systems. Thus, they have a number of security measures associated with them. Embodiments of the invention are particularly applicable to smart cards, particularly as the clock frequency in smart cards is likely to be very low when compared to the critical paths. Thus, there are large regions of the clock cycle where data transitions are not expected and any data transitions in such regions may indicate spurious activity.

In this embodiment, there is clock input 102 which goes to logic 104 which calculates a safe time window from various criteria that may be stored in data stores within the smart card such as data store 106. This is then input to spurious signal detection logic 110 which is also clocked by clock 102. This monitors a signal between two pieces of logic within a processor 120 within smart card 100 and if it detects transitions outside of a safe time window defined by logic 104 it outputs an error signal at output 112. This error signal may be used to disable the smart card.

With regard to the error signals that are output, they may be used to set a sticky bit in a sticky bit data store such that it is clear that one error has been detected. Alternatively, they can be used to fire an interrupt or in fact they can be used for any suitable mechanism.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A circuit for a data processing apparatus, said circuit comprising a data input operable to receive digital signal values, said circuit comprising:
   (i) spurious signal detection logic operable to monitor a digital signal value within said circuit, and determine at least one of: a safe time window during which it is expected that said digital signal values input into said circuit may cause data transitions in said monitored digital signal value and a transition time window in which it is expected a data transition will occur; and
   (ii) in response to detecting either a data transition in said monitored digital signal value outside of said at least one safe time window or no data transition in said transition window, said spurious signal detection logic is operable to output a detection signal.

2. A circuit according to claim 1, wherein said circuit comprises a synchronous circuit clocked by a clock signal, said digital signal value being clocked into said circuit;
   (i) said spurious signal detection logic being operable to determine at least one of a safe time window and a transition time window for each of said clock cycles.

3. A circuit according to claim 2, wherein said safe time window comprises a time between a start of a clock cycle and a transition of said monitored digital signal value.

4. A circuit according to claim 1, wherein spurious detection logic is operable to monitor two digital signal values and said safe time window comprises a predetermined time following a transition of one of said two monitored digital signal values.

5. A circuit according to claim 1, wherein said digital signal values received from said data input are received from registers, and said safe time window is dependent upon a state of said registers, such that in response to at least one predetermined state of said registers said safe time window is zero.

6. A circuit according to claim 5, wherein said safe time window is dependent upon an enabled state of said registers, such that in response to said registers not being enabled said safe time window is zero.

7. A circuit according to claim 1, wherein said digital signal values received from said data input are received from registers, and said transition time window is dependent upon a state of said registers.

8. A circuit according to claim 1, wherein said spurious detection logic is further operable to detect at least one input and in response to detecting a data transition within said safe time window is operable to output a detection signal if said at least one input has a predetermined value.

9. A circuit according to claim 1, wherein said circuit further comprises a sticky bit data store, said spurious signal detection logic being operable to output said detection signal to said sticky bit data store, such that a value stored in said sticky bit data store is indicative of whether a spurious signal has been detected.

10. A circuit according to claim 1, wherein said circuit further comprises processing logic, said spurious signal detection logic being operable to output said detection signal to said processing logic.

11. A circuit according to claim 1, wherein said digital signal values are received from logic, and said safe time period is determined from an estimated minimum and maximum time for said digital signal values launched into said logic to reach said data input of said circuit.

12. A circuit according to claim 1, said circuit further comprising logic, said digital signal values being launched into said logic and passing through said logic, said spurious signal monitoring logic being operable to monitor a signal value at a point within said logic.

13. A circuit according to claim 12, wherein at least a portion of said logic is operable to cause a delay to said transmission of said digital signal value such that at least one of said safe time window and transition time window is delayed with respect to said digital signal launch point.

14. A circuit according to claim 1, said circuit comprising at least one flip flop.

15. A circuit according to claim 1 wherein said spurious signal detection logic is operable to detect all data transitions occurring outside of said safe time window.

16. A circuit according to claim 1, wherein said circuit comprises an asynchronous circuit and comprises an output operable to output a data valid signal, said safe time window comprises a time following reception of an acknowledgement signal from a receiver and prior to outputting said data valid signal.

17. A circuit according to claim 1, wherein said circuit comprises an asynchronous circuit and comprises an output operable to output a data valid signal, and said safe time window comprises a time starting a predetermined time after said data valid signal is output and extending until a subsequent data valid signal is output.

18. A circuit according to claim 1 wherein said data processing apparatus is a smart card.

19. A circuit according to claim 1, wherein said spurious signal detection logic is operable to determine said at least one safe time window from a value within a data store in said circuit.

20. A method of detecting spurious signals within a circuit comprising:

(i) inputting digital signal values into said circuit;

(ii) monitoring a digital signal value within said circuit;

(iii) determining at least one at least one of: a safe time window during which it is expected that said digital signal values input into said circuit may cause data transitions in said monitored digital signal value and a transition time window in which it is expected a data transition will occur; and (iv) in response to detecting either a data transition in said monitored digital signal value outside of said at least one safe time window or no data transition in said transition window, said spurious signal detection logic is operable to output a detection signal;

(v) outputting a signal indicating a spurious signal has been detected.

* * * * *